United States Patent
Morisaki et al.

(10) Patent No.: US 12,301,130 B2
(45) Date of Patent: May 13, 2025

(54) POWER CONVERSION DEVICE AND METHOD OF DIAGNOSING FAILURES OF SWITCHING DEVICES

(71) Applicant: TMEIC Corporation, Chuo-ku (JP)

(72) Inventors: Kouki Morisaki, Tokyo (JP); Haiqing Li, Tokyo (JP)

(73) Assignee: TMEIC Corporation, Chuo-ku (JP)

( * ) Notice: Subject to any disclaimer, the term of this patent is extended or adjusted under 35 U.S.C. 154(b) by 137 days.

(21) Appl. No.: 18/005,491

(22) PCT Filed: Jul. 7, 2021

(86) PCT No.: PCT/JP2021/025558
§ 371 (c)(1),
(2) Date: Jan. 13, 2023

(87) PCT Pub. No.: WO2023/281643
PCT Pub. Date: Jan. 12, 2023

(65) Prior Publication Data
US 2023/0268847 A1    Aug. 24, 2023

(51) Int. Cl.
H02M 7/48       (2007.01)
H02M 1/32       (2007.01)
H02M 7/487     (2007.01)

(52) U.S. Cl.
CPC ............. H02M 7/487 (2013.01); H02M 1/32 (2013.01)

(58) Field of Classification Search
CPC ................................. H02M 7/487; H02M 1/32
See application file for complete search history.

(56) References Cited

U.S. PATENT DOCUMENTS

2015/0002125 A1*  1/2015  Kinoshita ............. H02M 3/158
                                                                    323/285
2021/0218345 A1*  7/2021  Yamaguchi ........... H02M 1/322

FOREIGN PATENT DOCUMENTS

JP          2003-33045 A       1/2003
JP         2012-210150 A      10/2012
(Continued)

OTHER PUBLICATIONS

International Search Report (with English Translation) and Written Opinion issued Sep. 21, 2021 in PCT/JP2021/025558, filed on Jul. 7, 2021, 12 pages.
(Continued)

*Primary Examiner* — Adolf D Berhane
*Assistant Examiner* — Afework S Demisse
(74) *Attorney, Agent, or Firm* — Oblon, McClelland, Maier & Neustadt, L.L.P.

(57) ABSTRACT

A power conversion device with a three-level TNPP circuit, includes: a voltage detection unit; a test pulse output unit that outputs a test pulse to an inner switching device connected in a forward direction from the DC neutral point to an AC output terminal when the voltages detected by the voltage detection unit rise and exceed a predetermined threshold; and a determination unit that determines, when the test pulse output unit outputs a test pulse to the inner switching device connected in the forward direction from the DC neutral point to the AC output terminal, upon drop in the voltage between the DC neutral point and the DC negative electrode detected by the voltage detection unit, that an outer switching device connected to the DC negative electrode has a short circuit failure.

16 Claims, 7 Drawing Sheets

(56) References Cited

FOREIGN PATENT DOCUMENTS

| | | |
|---|---|---|
| JP | 2013-176240 A | 9/2013 |
| JP | 2016-92977 A | 5/2016 |
| JP | 2020-72503 A | 5/2020 |
| JP | 6699253 B2 | 5/2020 |

OTHER PUBLICATIONS

Indian Office Action issued Feb. 15, 2024 in Indian Patent Application No. 202317005933, 6 pages.
International Preliminary Report on Patentability and Written Opinion issued Jan. 24, 2024 in PCT/JP2021/025558, 6 pages.
Japanese Office Action issued Nov. 7, 2023 in Japanese Patent Application No. 2023-532935 (with unedited computer-generated English Translation), 6 pages.
Japanese Office Action dated Mar. 19, 2024 in corresponding Japanese Patent Application No. 2023-532935 (with English translation), citing documents previously filed on a Form PTO-1449 on Jan. 13, 2023, 5 pages.

\* cited by examiner

| SHORT CIRCUIT FAILURE DEVICE | TEST PULSE | | | | DIAGNOS-ABILITY |
|---|---|---|---|---|---|
| | Q1 | Q2 | Q3 | Q4 | |
| Q1 | | × | P-C VOLTAGE DROP | P-N VOLTAGE DROP | ○ |
| Q2 | × | | C-N VOLTAGE DROP | C-N VOLTAGE DROP | ○ |
| Q3 | P-C VOLTAGE DROP | × | | × | ○ |
| Q4 | P-N VOLTAGE DROP | C-N VOLTAGE DROP | × | | ○ |

× : NONDIAGNOSABLE

| | | TEST PULSE | | | DIAGNOS-ABILITY |
|---|---|---|---|---|---|
| | | Q1+Q2 | Q2+Q3 | Q3+Q4 | |
| SHORT CIRCUIT FAILURE DEVICE | Q1 | | P-C VOLTAGE DROP | × | ○ |
| | Q2 | | | C-N VOLTAGE DROP | ○ |
| | Q3 | P-C VOLTAGE DROP | | | ○ |
| | Q4 | × | C-N VOLTAGE DROP | | ○ |

× : NONDIAGNOSABLE

| | TEST PULSE | | DIAGNOS-ABILITY |
| --- | --- | --- | --- |
| | Q1 | Q4 | |
| SHORT CIRCUIT FAILURE DEVICE — Q1 | | P-C VOLTAGE DROP、 C-N VOLTAGE DROP | O |
| SHORT CIRCUIT FAILURE DEVICE — Q4 | P-C VOLTAGE DROP、 C-N VOLTAGE DROP | | O |

POWER CONVERSION DEVICE AND METHOD OF DIAGNOSING FAILURES OF SWITCHING DEVICES

FIELD

The present invention relates to a power conversion device and a method of diagnosing failures of switching devices.

BACKGROUND

A power conversion device that performs power conversion of DC power output from a DC power supply device, such as a photovoltaic (PV) device, to supply it to an AC power supply system has, for example, multiple switching devices such as insulated gate bipolar transistors (IGBTs).

Conventionally, diagnosis of failures of switching devices would be performed manually during inspections of power conversion devices before their shipping from the factory. Patent Literature 1 discloses an example of a power conversion device capable of diagnosing failures of switching devices.

CITATION LIST

Patent Literature

[PTL 1] Japanese Patent No. 6699253

SUMMARY

Technical Problem

However, conventionally, determination of whether or not a switching device is damaged when the power conversion device is first operated after installation of the power conversion device or after long-term storage of the power conversion device would not always be achievable. If the switching device is damaged and the operator operates the power conversion device without noticing it, for example, an accident may occur or parts may be damaged.

An object of the present invention is to provide a power conversion device capable of diagnosing the presence or absence of short-circuit failures of switching devices, even while remaining connected to a DC power supply device, and a method of diagnosing failures of the switching devices.

Solution to Problem

A power conversion device according to one aspect of the present invention, a power conversion device with a three-level TNPP circuit, comprising: a voltage detection unit that detects the voltage between a DC positive electrode and a DC neutral point, the voltage between the DC neutral point and a DC negative electrode, and the voltage between the DC positive electrode and the DC negative electrode; a test pulse output unit that outputs a test pulse to an inner switching device connected in a forward direction from the DC neutral point to an AC output terminal when the voltages detected by the voltage detection unit rise and exceed a predetermined threshold; and a determination unit that determines, when the test pulse output unit outputs a test pulse to the inner switching device connected in the forward direction from the DC neutral point to the AC output terminal, upon drop in the voltage between the DC neutral point and the DC negative electrode detected by the voltage detection unit, that an outer switching device connected to the DC negative electrode has a short circuit failure.

And a power conversion device according to one aspect of the present invention, a power conversion device with a three-level TNPP circuit, comprising: a voltage detection unit that detects the voltage between a DC positive electrode and a DC neutral point, the voltage between the DC neutral point and a DC negative electrode, and the voltage between the DC positive electrode and the DC negative electrode; a test pulse output unit that outputs a test pulse to an inner switching device connected in a reverse direction from the DC neutral point to an AC output terminal when the voltages detected by the voltage detection unit rise and exceed a predetermined threshold; and a determination unit that determines, when the test pulse output unit outputs a test pulse to the inner switching device connected in the reverse direction from the DC neutral point to the AC output terminal, upon drop in the voltage between the DC positive electrode and the DC neutral point detected by the voltage detection unit, that an outer switching device connected to the DC positive electrode has a short circuit failure.

And a power conversion device according to one aspect of the present invention, a power conversion device with a three-level TNPP circuit, comprising: a voltage detection unit that detects the voltage between a DC positive electrode and a DC neutral point, the voltage between the DC neutral point and a DC negative electrode, and the voltage between the DC positive electrode and the DC negative electrode; a test pulse output unit that outputs a test pulse to an outer switching device connected to the DC positive electrode when the voltages detected by the voltage detection unit rise and exceed a predetermined threshold; and a determination unit that determines, when the test pulse output unit outputs a test pulse to the outer switching device connected to the DC positive electrode, upon drop in the voltage between the DC positive electrode and the DC neutral point detected by the voltage detection unit, that an inner switching device connected in a reverse direction from the DC neutral point to an AC output terminal has a short circuit failure.

And a power conversion device according to one aspect of the present invention, a power conversion device with a three-level TNPP circuit, comprising: a voltage detection unit that detects the voltage between a DC positive electrode and a DC neutral point, the voltage between the DC neutral point and a DC negative electrode, and the voltage between the DC positive electrode and the DC negative electrode; a test pulse output unit that outputs a test pulse to an outer switching device connected to a DC positive electrode when the voltages detected by the voltage detection unit rise and exceed a predetermined threshold; and a determination unit that determines, when the test pulse output unit outputs a test pulse to the outer switching device connected to the DC positive electrode, upon drop in the voltage between the DC positive electrode and the DC negative electrode detected by the voltage detection unit, that an outer switching device connected to the DC negative electrode has a short circuit failure.

And a power conversion device according to one aspect of the present invention, a power conversion device with a three-level TNPP circuit, comprising: a voltage detection unit that detects the voltage between a DC positive electrode and a DC neutral point, the voltage between the DC neutral point and a DC negative electrode, and the voltage between the DC positive electrode and the DC negative electrode; a test pulse output unit that outputs a test pulse to an outer switching device connected to a DC negative electrode when the voltages detected by the voltage detection unit rise and exceed a predetermined threshold; and a determination unit that determines, when the test pulse output unit outputs a test pulse to the outer switching device connected to the DC negative electrode, upon drop in the voltage between the DC positive electrode and the DC negative electrode detected by the voltage detection unit, that an outer switching device connected to the DC positive electrode has a short circuit failure.

And a power conversion device according to one aspect of the present invention, a power conversion device with a three-level TNPP circuit, comprising: a voltage detection unit that detects the voltage between a DC positive electrode and a DC neutral point, the voltage between the DC neutral point and a DC negative electrode, and the voltage between the DC positive electrode and the DC negative electrode; a test pulse output unit that outputs a test pulse to an outer switching device connected to a DC negative electrode when the voltages detected by the voltage detection unit rise and exceed a predetermined threshold; and a determination unit that determines, when the test pulse output unit outputs a test pulse to the outer switching device connected to the DC negative electrode, upon drop in the voltage between the DC neutral point and the DC negative electrode detected by the voltage detection unit, that an inner switching device connected in a forward direction from the DC neutral point to an AC output terminal has a short circuit failure.

And a power conversion device according to one aspect of the present invention, a power conversion device with a three-level NPP circuit, comprising: a voltage detection unit that detects the voltage between a DC positive electrode and a DC neutral point, the voltage between the DC neutral point and a DC negative electrode, and the voltage between the DC positive electrode and the DC negative electrode; a test pulse output unit that outputs a test pulse to an outer switching device connected to a DC positive electrode and an inner switching device adjacent to the DC positive electrode when the voltages detected by the voltage detection unit rise and exceed a predetermined threshold; and a determination unit that determines, when the test pulse output unit outputs a test pulse to the outer switching device connected to the DC positive electrode and the inner switching device adjacent to the DC positive electrode, upon drop in the voltage between the DC positive electrode and the DC neutral point detected by the voltage detection unit, that an inner switching device adjacent to the DC negative electrode has a short circuit failure.

And a power conversion device according to one aspect of the present invention, a power conversion device with a three-level NPP circuit, comprising: a voltage detection unit that detects the voltage between a DC positive electrode and a DC neutral point, the voltage between the DC neutral point and a DC negative electrode, and the voltage between the DC positive electrode and the DC negative electrode; a test pulse output unit that outputs a test pulse to an inner switching device adjacent to the DC positive electrode and an inner switching device adjacent to the DC negative electrode when the voltages detected by the voltage detection unit rise and exceed a predetermined threshold; and a determination unit that determines, when the test pulse output unit outputs a test pulse to the inner switching device adjacent to the DC positive electrode and the inner switching device adjacent to the DC negative electrode, upon drop in the voltage between the DC positive electrode and the DC neutral point detected by the voltage detection unit, that an outer switching device connected to the DC positive electrode has a short circuit failure.

And a power conversion device according to one aspect of the present invention, a power conversion device with a three-level NPP circuit, comprising: a voltage detection unit that detects the voltage between a DC positive electrode and a DC neutral point, the voltage between the DC neutral point and a DC negative electrode, and the voltage between the DC positive electrode and the DC negative electrode; a test pulse output unit that outputs a test pulse to an inner switching device adjacent to the DC positive electrode and an inner switching device adjacent to the DC negative electrode when the voltages detected by the voltage detection unit rise and exceed a predetermined threshold; and a determination unit that determines, when the test pulse output unit outputs a test pulse to the inner switching device adjacent to the DC positive electrode and the inner switching device adjacent to the DC negative electrode, upon drop in the voltage between the DC neutral point and the DC negative electrode detected by the voltage detection unit, that an outer switching device connected to the DC negative electrode has a short circuit failure.

A power conversion device according to one aspect of the present invention, a power conversion device with a three-level NPP circuit, comprising: a voltage detection unit that detects the voltage between a DC positive electrode and a DC neutral point, the voltage between the DC neutral point and a DC negative electrode, and the voltage between the DC positive electrode and the DC negative electrode; a test pulse output unit that outputs a test pulse to an inner switching device adjacent to the DC negative electrode and an outer switching device connected to the DC negative electrode when the voltages detected by the voltage detection unit rise and exceed a predetermined threshold; and a determination unit that determines, when the test pulse output unit outputs a test pulse to the inner switching device adjacent to the DC negative electrode and the outer switching device connected to the DC negative electrode, upon drop in the voltage between the DC neutral point and the DC negative electrode detected by the voltage detection unit, that an inner switching device adjacent to the DC positive electrode has a short circuit failure.

And a power conversion device according to one aspect of the present invention, a power conversion device with a two-level switching circuit, comprising: a voltage detection unit that detects the voltage between a DC positive electrode and a DC neutral point, the voltage between the DC neutral point and a DC negative electrode, and the voltage between the DC positive electrode and the DC negative electrode; a test pulse output unit that outputs a test pulse to a switching device connected to the DC positive electrode when the voltages detected by the voltage detection unit rise and exceed a predetermined threshold; and a determination unit that determines, when the test pulse output unit outputs a test pulse to the switching device connected to the DC positive electrode, upon drop in the voltage between the DC positive electrode and the DC neutral point and the voltage between the DC neutral point and the DC negative electrode detected by the voltage detection unit, that a switching device connected to the DC negative electrode has a short circuit failure.

And a power conversion device according to one aspect of the present invention, a power conversion device with a two-level switching circuit, comprising: a voltage detection unit that detects the voltage between a DC positive electrode and a DC neutral point, the voltage between the DC neutral point and a DC negative electrode, and the voltage between the DC positive electrode and the DC negative electrode; a test pulse output unit that outputs a test pulse to a switching device connected to the DC negative electrode when the voltages detected by the voltage detection unit rise and exceed a predetermined threshold; and a determination unit that determines, when the test pulse output unit outputs a test pulse to the switching device connected to the DC negative electrode, upon drop in the voltage between the DC positive electrode and the DC neutral point and the voltage between the DC neutral point and the DC negative electrode detected by the voltage detection unit, that a switching device connected to the DC positive electrode has a short circuit failure.

And a method of diagnosing failures of switching devices according to one aspect of the present invention, a method of diagnosing failures of switching devices included in a three-level TNPP circuit, comprising: a voltage detection step of detecting the voltage between a DC positive electrode and a DC neutral point, the voltage between the DC neutral point and a DC negative electrode, and the voltage between the DC positive electrode and the DC negative electrode; a test pulse output step of outputting a test pulse to an inner switching device connected in a forward direction from the DC neutral point to an AC output terminal when the detected voltages rise and exceed a predetermined threshold; and a determination step of determining, when a test pulse is output to the inner switching device connected in the forward direction from the DC neutral point to the AC output terminal, upon drop in the voltage between the DC neutral point and the DC negative electrode, that an outer switching device connected to the DC negative electrode has a short circuit failure.

And a method of diagnosing failures of switching devices according to one aspect of the present invention, a method of diagnosing failures of switching devices included in a three-level TNPP circuit, comprising: a voltage detection step of detecting the voltage between a DC positive electrode and a DC neutral point, the voltage between the DC neutral point and a DC negative electrode, and the voltage between the DC positive electrode and the DC negative electrode; a test pulse output step of outputting a test pulse to an inner switching device connected in a reverse direction from the DC neutral point to an AC output terminal when the detected voltages rise and exceed a predetermined threshold; and a determination step of determining, when a test pulse is output to the inner switching device connected in the reverse direction from the DC neutral point to the AC output terminal, upon drop in the voltage between the DC positive electrode and the DC neutral point, that an outer switching device connected to the DC positive electrode has a short circuit failure.

And a method of diagnosing failures of switching devices according to one aspect of the present invention, a method of diagnosing failures of switching devices included in a three-level TNPP circuit, comprising: a voltage detection step of detecting the voltage between a DC positive electrode and a DC neutral point, the voltage between the DC neutral point and a DC negative electrode, and the voltage between the DC positive electrode and the DC negative electrode; a test pulse output step of outputting a test pulse to an outer switching device connected to the DC positive electrode when the detected voltages rise and exceed a predetermined threshold; and a determination step of determining, when a test pulse is output to the outer switching device connected to the DC positive electrode, upon drop in the voltage between the DC positive electrode and the DC neutral point, that an inner switching device connected in a reverse direction from the DC neutral point to an AC output terminal has a short circuit failure.

And a method of diagnosing failures of switching devices according to one aspect of the present invention, a method of diagnosing failures of switching devices included in a three-level TNPP circuit, comprising: a voltage detection step of detecting the voltage between a DC positive electrode and a DC neutral point, the voltage between the DC neutral point and a DC negative electrode, and the voltage between the DC positive electrode and the DC negative electrode; a test pulse output step of outputting a test pulse to an outer switching device connected to a DC positive electrode when the detected voltages rise and exceed a predetermined threshold; and a determination step of determining, when a test pulse is output to the outer switching device connected to the DC positive electrode, upon drop in the voltage between the DC positive electrode and the DC negative electrode, that an outer switching device connected to the DC negative electrode has a short circuit failure.

And a method of diagnosing failures of switching devices according to one aspect of the present invention, a method of diagnosing failures of switching devices included in a three-level TNPP circuit, comprising: a voltage detection step of detecting the voltage between a DC positive electrode and a DC neutral point, the voltage between the DC neutral point and a DC negative electrode, and the voltage between the DC positive electrode and the DC negative electrode; a test pulse output step of outputting a test pulse to an outer switching device connected to a DC negative electrode when the detected voltages rise and exceed a predetermined threshold; and a determination step of determining, when a test pulse is output to the outer switching device connected to the DC negative electrode, upon drop in the voltage between the DC positive electrode and the DC negative electrode, that an outer switching device connected to the DC positive electrode has a short circuit failure.

And a method of diagnosing failures of switching devices according to one aspect of the present invention, a method of diagnosing failures of switching devices included in a three-level TNPP circuit, comprising: a voltage detection step of detecting the voltage between a DC positive electrode and a DC neutral point, the voltage between the DC neutral point and a DC negative electrode, and the voltage between the DC positive electrode and the DC negative electrode; a test pulse output step of outputting a test pulse to an outer switching device connected to a DC negative electrode when the detected voltages rise and exceed a predetermined threshold; and a determination step of determining, when a test pulse is output to the outer switching device connected to the DC negative electrode, upon drop in the voltage between the DC neutral point and the DC negative electrode, that an inner switching device connected in a forward direction from the DC neutral point to an AC output terminal has a short circuit failure.

And a method of diagnosing failures of switching devices according to one aspect of the present invention, a method of diagnosing failures of switching devices included in a three-level NPP circuit, comprising: a voltage detection step of detecting the voltage between a DC positive electrode and a DC neutral point, the voltage between the DC neutral point and a DC negative electrode, and the voltage between the DC positive electrode and the DC negative electrode; a test pulse output step of outputting a test pulse to an outer switching device connected to a DC positive electrode and an inner switching device adjacent to the DC positive electrode when the detected voltages rise and exceed a predetermined threshold; and a determination step of determining, when a test pulse is output to the outer switching device connected to the DC positive electrode and the inner switching device adjacent to the DC positive electrode, upon drop in the voltage between the DC positive electrode and the DC neutral point, that an inner switching device adjacent to the DC negative electrode has a short circuit failure.

And a method of diagnosing failures of switching devices according to one aspect of the present invention, a method of diagnosing failures of switching devices included in a three-level NPP circuit, comprising: a voltage detection step of detecting the voltage between a DC positive electrode and a DC neutral point, the voltage between the DC neutral point and a DC negative electrode, and the voltage between the DC positive electrode and the DC negative electrode; a test pulse output step of outputting a test pulse to an inner switching device adjacent to the DC positive electrode and an inner switching device adjacent to the DC negative electrode when the detected voltages rise and exceed a predetermined threshold; and a determination step of determining, when a test pulse is output to the inner switching device adjacent to the DC positive electrode and the inner switching device adjacent to the DC negative electrode, upon drop in the voltage between the DC positive electrode and the DC neutral point, that an outer switching device connected to the DC positive electrode has a short circuit failure.

And a method of diagnosing failures of switching devices according to one aspect of the present invention, a method of diagnosing failures of switching devices included in a three-level NPP circuit, comprising: a voltage detection step of detecting the voltage between a DC positive electrode and a DC neutral point, the voltage between the DC neutral point and a DC negative electrode, and the voltage between the DC positive electrode and the DC negative electrode; a test pulse output step of outputting a test pulse to an inner switching device adjacent to the DC positive electrode and an inner switching device adjacent to the DC negative electrode when the detected voltages rise and exceed a predetermined threshold; and a determination step of determining, when a test pulse is output to the inner switching device adjacent to the DC positive electrode and the inner switching device adjacent to the DC negative electrode, upon drop in the voltage between the DC neutral point and the DC negative electrode, that an outer switching device connected to the DC negative electrode has a short circuit failure.

And a method of diagnosing failures of switching devices according to one aspect of the present invention, a method of diagnosing failures of switching devices included in a three-level NPP circuit, comprising: a voltage detection step of detecting the voltage between a DC positive electrode and a DC neutral point, the voltage between the DC neutral point and a DC negative electrode, and the voltage between the DC positive electrode and the DC negative electrode; a test pulse output step of outputting a test pulse to an inner switching device adjacent to the DC negative electrode and an outer switching device connected to the DC negative electrode when the detected voltages rise and exceed a predetermined threshold; and a determination step of determining, when a test pulse is output to the inner switching device adjacent to the DC negative electrode and the outer switching device connected to the DC negative electrode, upon drop in the voltage between the DC neutral point and the DC negative electrode, that an inner switching device adjacent to the DC positive electrode has a short circuit failure.

And a method of diagnosing failures of switching devices according to one aspect of the present invention, a method of diagnosing failures of switching devices included in a two-level switching circuit, comprising: a voltage detection step of detecting the voltage between a DC positive electrode and a DC neutral point, the voltage between the DC neutral point and a DC negative electrode, and the voltage between the DC positive electrode and the DC negative electrode; a test pulse output step of outputting a test pulse to a switching device connected to the DC positive electrode when the detected voltages rise and exceed a predetermined threshold; and a determination step of determining, when a test pulse is output to the switching device connected to the DC positive electrode, upon drop in the voltage between the DC positive electrode and the DC neutral point and the voltage between the DC neutral point and the DC negative electrode, that a switching device connected to the DC negative electrode has a short circuit failure.

And a method of diagnosing failures of switching devices according to one aspect of the present invention, a method of diagnosing failures of switching devices included in a two-level switching circuit, comprising: a voltage detection step of detecting the voltage between a DC positive electrode and a DC neutral point, the voltage between the DC neutral point and a DC negative electrode, and the voltage between the DC positive electrode and the DC negative electrode; a test pulse output step of outputting a test pulse to a switching device connected to the DC negative electrode when the detected voltages rise and exceed a predetermined threshold; and a determination step of determining, when the test pulse output unit outputs a test pulse to the switching device connected to the DC negative electrode, upon drop in the voltage between the DC positive electrode and the DC neutral point and the voltage between the DC neutral point and the DC negative electrode, that a switching device connected to the DC positive electrode has a short circuit failure.

Advantageous Effect of the Invention

According to the present invention, the presence or absence of short-circuit failures of switching devices can be diagnosed even during connection to a DC power supply device.

DESCRIPTION OF EMBODIMENTS

An embodiment of a power system including a power conversion device will be described below with reference to the attached drawings.

First Embodiment

Figure 1:
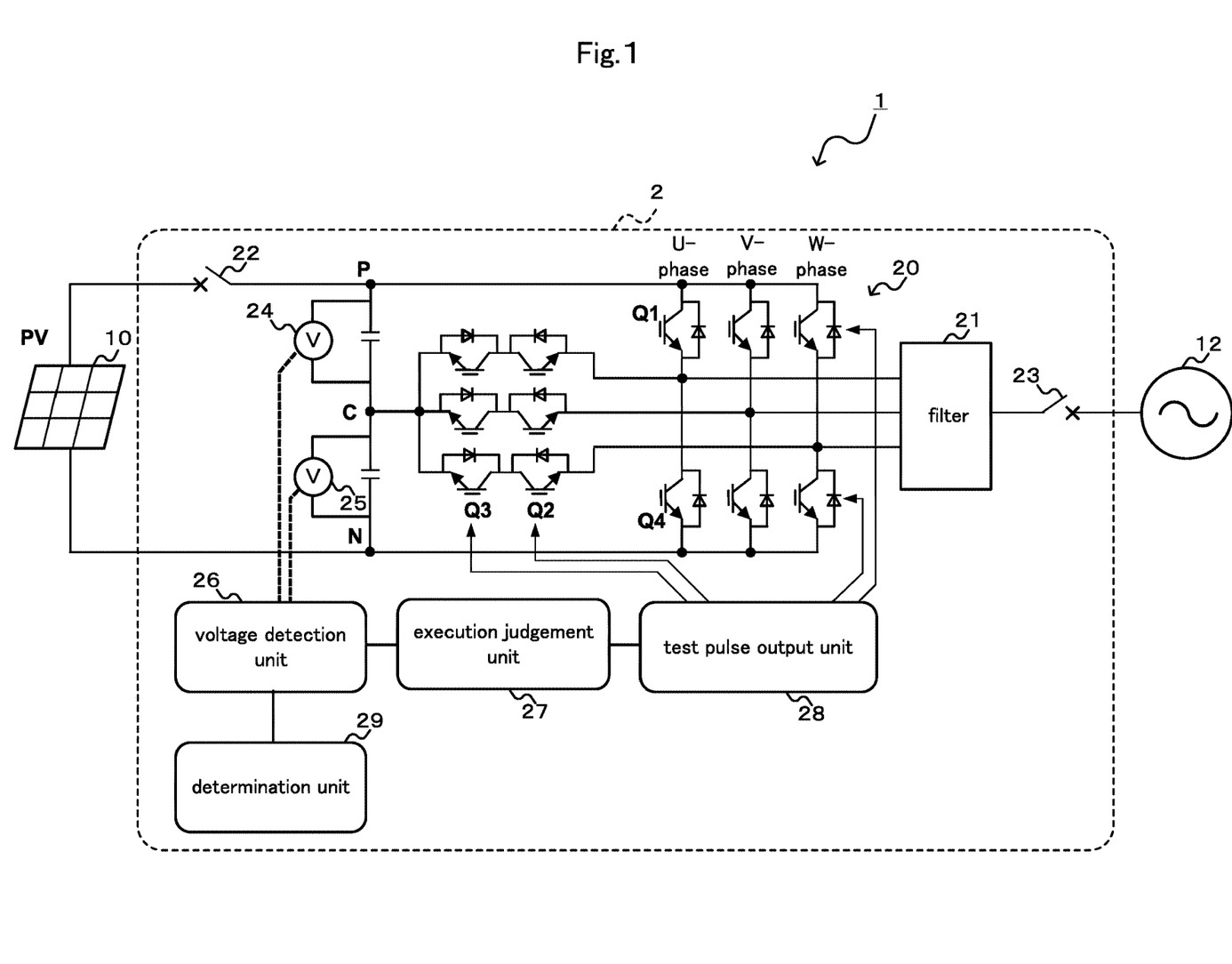
FIG. 1 is a diagram showing an example configuration of a power system including a power conversion device according to the first embodiment.

FIG. 1 is a diagram showing an example configuration of a power system 1 including a power conversion device according to the first embodiment. As shown in FIG. 1, the power system 1 is configured so that, for example, the power conversion device 2 converts the DC power output from the photovoltaic device 10 and supplies it to the AC power supply system 12.

The power conversion device 2 includes, for example, a three-phase, three-level T-typed neutral point piloted (TNPP) circuit 20, a filter 21, a circuit breaker 22, a circuit breaker 23, a voltmeter 24, a voltmeter 25, a voltage detection unit 26, an execution judgement unit 27, a test pulse output unit 28, and a determination unit 29.

The three-level TNPP circuit 20 is an inverter circuit that performs power conversion in the TNPP way for each of the three phases: U-phase, V-phase, and W-phase.

The filter 21 is, for example, an LC filter, and performs filtering of the three-level power output from the three-level TNPP circuit 20, and outputs it to the circuit breaker 23.

The circuit breaker 22 interrupts the DC power output from the photovoltaic device 10. The circuit breaker 23 interrupts the power output from the filter 21.

The voltmeter 24 measures the voltage between the DC positive electrode (P) and the DC neutral point (C) for the three-level TNPP circuit 20 and outputs it to the voltage detection unit 26.

The voltmeter 25 measures the voltage between the DC neutral point (C) and the DC negative electrode (N) for the three-level TNPP circuit 20 and outputs it to the voltage detection unit 26.

The voltage detection unit 26 detects the voltage between the DC positive electrode and the DC neutral point, the voltage between the DC neutral point and the DC negative electrode, and the voltage between the DC positive electrode and the DC negative electrode based on the voltage measured by the voltmeter 24 and the voltage measured by the voltmeter 25, and outputs the detection results to the execution judgement unit 27 and the determination unit 29.

When the voltages detected by the voltage detection unit 26 increase and exceed a predetermined threshold, the execution judgement unit 27 judges that the power conversion device 2 should perform a self-diagnosis for a failure of a switching device.

When the execution judgement unit 27 judges that self-diagnosis is to be executed, the test pulse output unit 28 outputs a test pulse as described below to each switching device included in the three-level TNPP circuit 20. A test pulse is, for example, a one-shot pulse of several milliseconds.

When the test pulse output unit 28 outputs a predetermined test pulse as described below, the determination unit 29 determines whether or not each switching device in the three-level TNPP circuit 20 has a short circuit failure, based on at least one of the voltages detected by the voltage detection unit 26.

Figure 2:
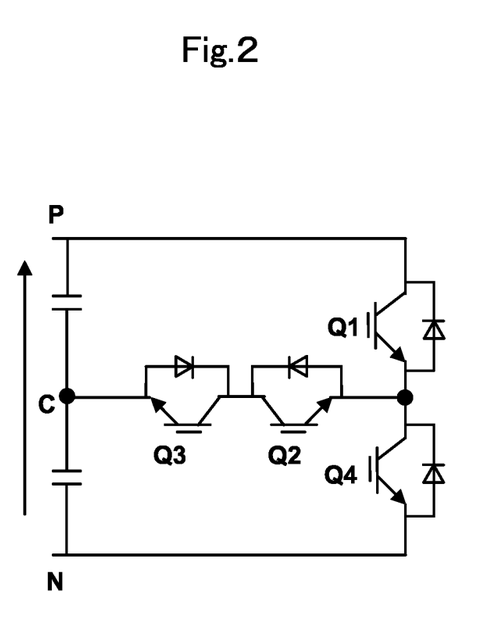
FIG. 2 is a diagram showing the TNPP circuit for one phase of the three-level TNPP circuit.

FIG. 2 is a diagram showing the TNPP circuit for one phase of the three-level TNPP circuit 20. The three-level TNPP circuit 20 has the TNPP circuit shown in FIG. 2 for each of the three phases. Here, the switching devices are denoted as follows.

Q1: Outer switching device connected to the DC positive electrode
Q2: Inner switching device connected in the forward direction from the DC neutral point to the AC output terminal
Q3: Inner switching device connected in the reverse direction from the DC neutral point to the AC output terminal
Q4: Outer switching device connected to the DC negative electrode FIG. 3 is a diagram showing the relationship between the destination of the output test pulse and the short-circuit failure device (switching device) in the failure diagnosis performed in the power conversion device 2.

Figure 3:
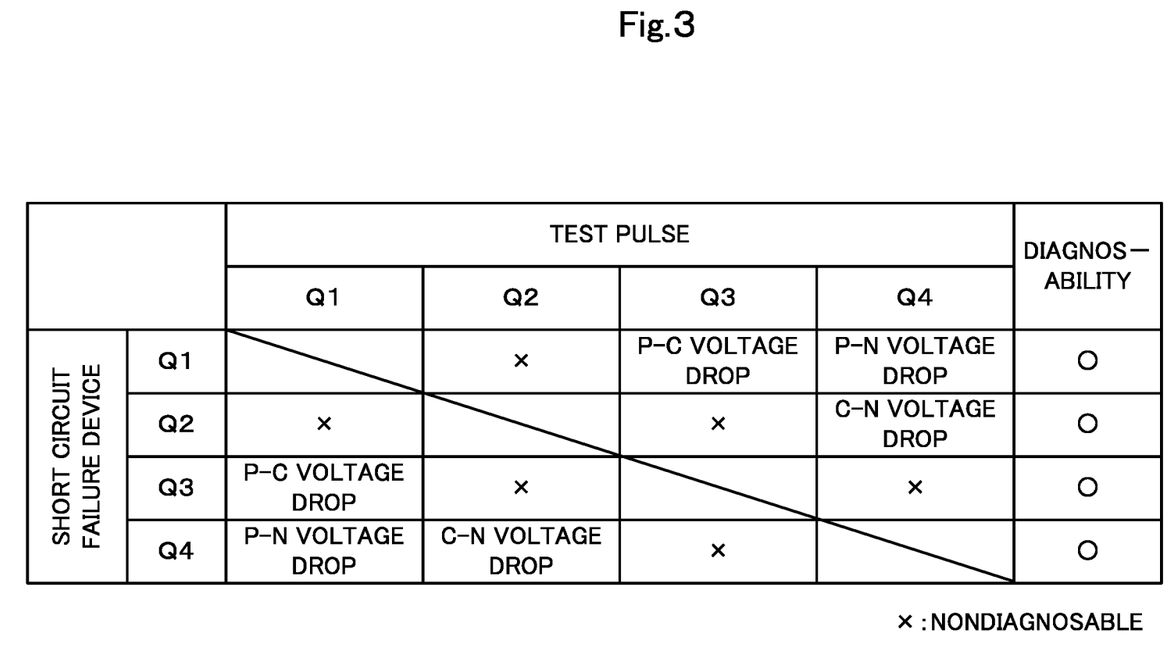
FIG. 3 is a diagram showing the relationship between the destination of the output test pulse and the short-circuit failure device (switching device) in the failure diagnosis performed in the power conversion device.

As shown in FIG. 3, in the power conversion device 2, when the test pulse output unit 28 outputs a test pulse to the inner switching device connected in the forward direction from the DC neutral point to the AC output terminal, the determination unit 29 determines, upon drop in the voltage between the DC neutral point and the DC negative electrode detected by the voltage detection unit 26, that the outer switching device connected to the DC negative electrode has a short circuit failure.

Also, in the power conversion device 2, when the test pulse output unit 28 outputs a test pulse to the inner switching device connected in the reverse direction from the DC neutral point to the AC output terminal, the determination unit 29 determines, upon drop in the voltage between the DC positive electrode and the DC neutral point detected by the voltage detection unit 26, that the outer switching device connected to the DC positive electrode has a short circuit failure.

Also, in the power conversion device 2, when the test pulse output unit 28 outputs a test pulse to the outer switching device connected to the DC positive electrode, the determination unit 29 determines, upon drop in the voltage between the DC positive electrode and the DC neutral point detected by the voltage detection unit 26, that the inner switching device connected in the reverse direction from the DC neutral point to the AC output terminal has a short circuit failure.

Also, in the power conversion device 2, when the test pulse output unit 28 outputs a test pulse to the outer switching device connected to the DC positive electrode, the determination unit 29 determines, upon drop in the voltage between the DC positive electrode and the DC negative electrode detected by the voltage detection unit 26, that the outer switching device connected to the DC negative electrode has a short circuit failure.

Also, in the power conversion device 2, when the test pulse output unit 28 outputs a test pulse to the outer switching device connected to the DC negative electrode, the determination unit 29 determines, upon drop in the voltage between the DC positive electrode and the DC negative electrode detected by the voltage detection unit 26, that the outer switching device connected to the DC positive electrode has a short circuit failure.

Also, in the power conversion device 2, when the test pulse output unit 28 outputs a test pulse to the outer switching device connected to the DC negative electrode, the determination unit 29 determines, upon drop in the voltage between the DC neutral point and the DC negative electrode detected by the voltage detection unit 26, that the inner switching device connected in the forward direction from the DC neutral point to the AC output terminal has a short circuit failure.

Regarding the order of diagnosis, in order to avoid PN short circuits, the power conversion device 2 preferably diagnoses Q2 and Q3 and then diagnoses Q1 and Q4.

Second Embodiment

Figure 4:
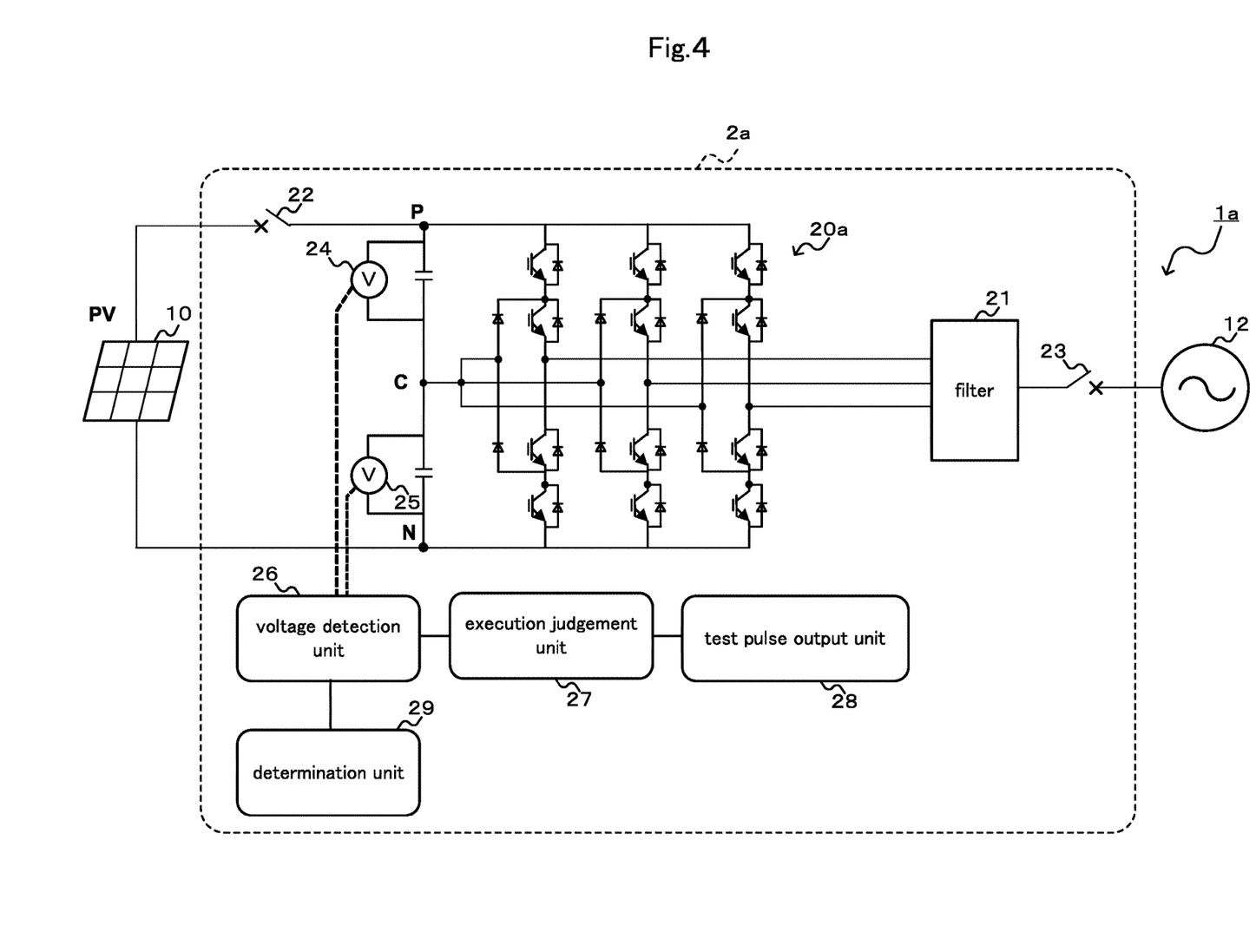
FIG. 4 is a diagram showing an example configuration of a power system including a power conversion device according to the second embodiment.

FIG. 4 is a diagram showing an example configuration of a power system 1a including a power conversion device according to the second embodiment. As shown in FIG. 4, the power system 1a is configured so that, for example, the power conversion device 2a converts the DC power output from the photovoltaic device 10 and supplies it to the AC power supply system 12. Components that are substantially the same as the corresponding components described above will hereinafter be denoted by the same reference numerals as the corresponding components unless otherwise stated.

The power conversion device 2a includes, for example, a three-phase, three-level neutral point piloted (NPP) circuit 20a, a filter 21, a circuit breaker 22, a circuit breaker 23, a voltmeter 24, a voltmeter 25, a voltage detection unit 26, an execution judgement unit 27, a test pulse output unit 28, and a determination unit 29.

The three-level NPP circuit 20a is an inverter circuit that performs NPP power conversion for each of the three phases: U-phase, V-phase, and W-phase.

Figure 5:
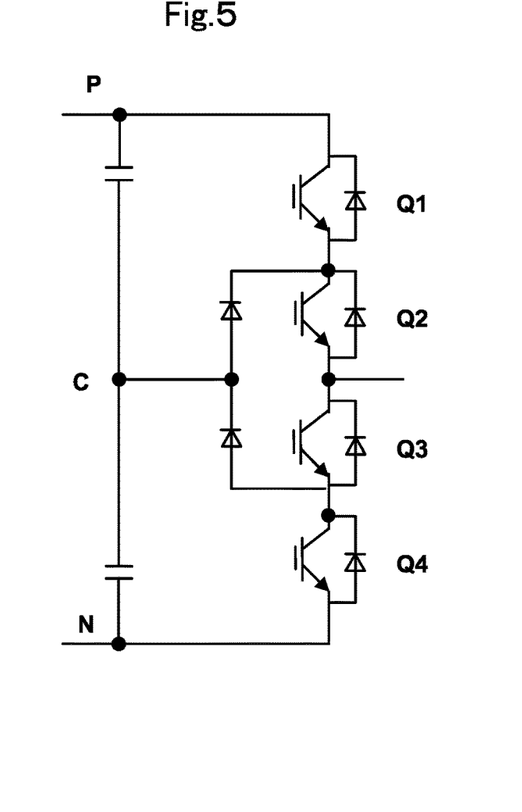
FIG. 5 is a diagram showing the NPP circuit for one phase of the three-level NPP circuit.

FIG. 5 is a diagram showing the NPP circuit for one phase of the three-level NPP circuit 20a. The three-level NPP circuit 20a has the NPP circuit shown in FIG. 5 for each of the three phases. Here, the switching devices are denoted as follows.

Q1: Outer switching device connected to the DC positive electrode
Q2: Inner switching device adjacent to the DC positive electrode
Q3: Inner switching device adjacent to the DC negative electrode
Q4: Outer switching device connected to the DC negative electrode FIG. 6 is a diagram showing the relationship between the destination of the output test pulse and the short-circuit failure device (switching device) in the failure diagnosis performed in the power conversion device 2a.

Figure 6:
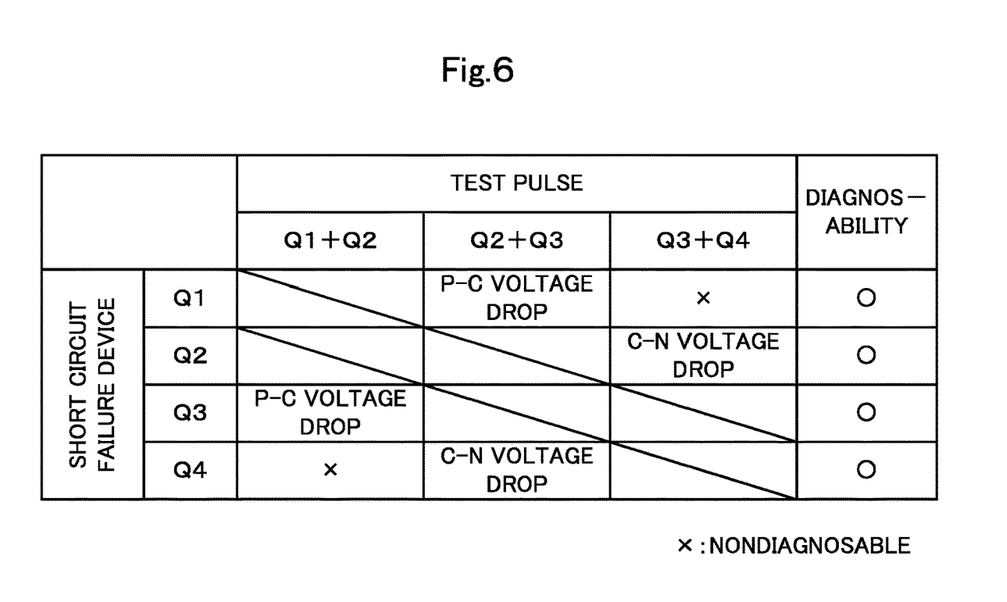
FIG. 6 is a diagram showing the relationship between the destination of the output test pulse and the short-circuit failure device (switching device) in the failure diagnosis performed in the power conversion device.

As shown in FIG. 6, in the power conversion device 2a, when the test pulse output unit 28 outputs a test pulse to the outer switching device connected to the DC positive electrode and the inner switching device adjacent to the DC positive electrode, the determination unit 29 determines, upon drop in the voltage between the DC positive electrode and the DC neutral point detected by the voltage detection unit 26, that the inner switching device adjacent to the DC negative electrode has a short circuit failure.

Also, in the power conversion device 2a, when the test pulse output unit 28 outputs a test pulse to the inner switching device adjacent to the DC positive electrode and the inner switching device adjacent to the DC negative electrode, the determination unit 29 determines, upon drop in the voltage between the DC positive electrode and the DC neutral point detected by the voltage detection unit 26, that the outer switching device connected to the DC positive electrode has a short circuit failure.

Also, in the power conversion device 2a, when the test pulse output unit 28 outputs a test pulse to the inner switching device on the DC positive electrode side and the inner switching device on the DC negative electrode side, the determination unit 29 determines, upon drop in the voltage between the DC neutral point and the DC negative electrode detected by the voltage detection unit 26, that the outer switching device connected to the DC negative electrode has a short circuit failure.

Also, in the power conversion device 2a, when the test pulse output unit 28 outputs a test pulse to the inner switching device adjacent to the DC negative electrode and the outer switching device connected to the DC negative electrode, the determination unit 29 determines, upon drop in the voltage between the DC neutral point and the DC negative electrode detected by the voltage detection unit 26, that the inner switching device adjacent to the DC positive electrode has a short circuit failure.

Third Embodiment

Figure 7:
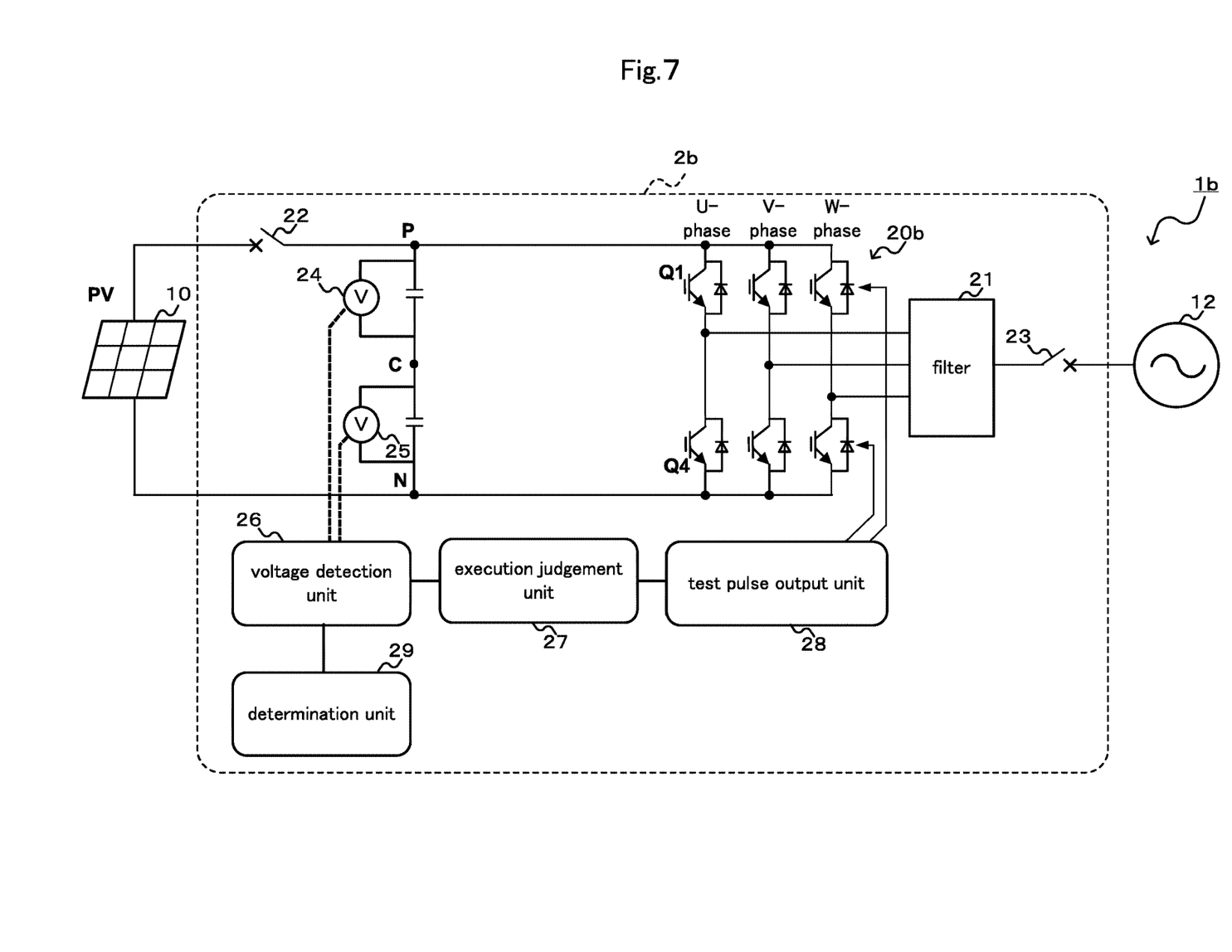
FIG. 7 is a diagram showing an example configuration of a power system including a power conversion device according to the third embodiment.

FIG. 7 is a diagram showing an example configuration of a power system 1b including a power conversion device according to the third embodiment. As shown in FIG. 7, the power system 1b is configured so that, for example, the power conversion device 2b converts the DC power output from the photovoltaic device 10 and supplies it to the AC power supply system 12. Components that are substantially the same as the corresponding components described above will hereinafter be denoted by the same reference numerals as the corresponding components unless otherwise stated.

The power conversion device 2b includes, for example, a three-phase, two-level switching circuit 20b, a filter 21, a circuit breaker 22, a circuit breaker 23, a voltmeter 24, a voltmeter 25, a voltage detection unit 26, an execution judgement unit 27, a test pulse output unit 28, and a determination unit 29.

The two-level switching circuit 20b is an inverter circuit that performs two-level power conversion for each of the three phases: U-phase, V-phase, and W-phase.

Figure 8:
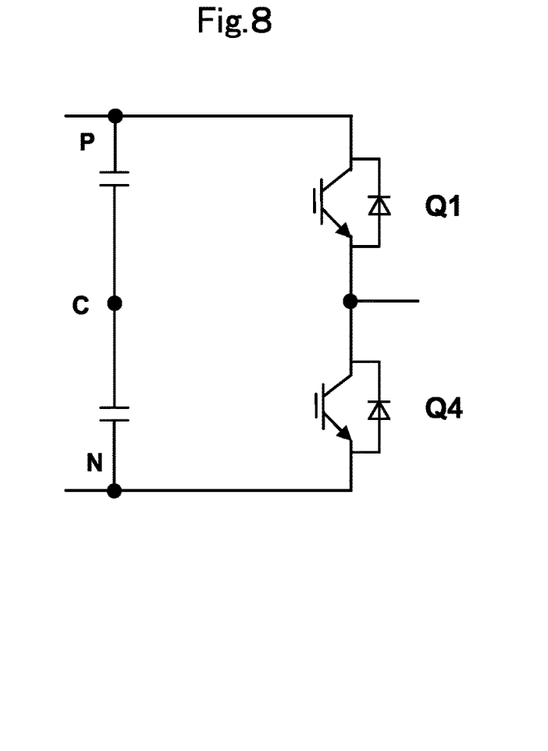
FIG. 8 is a diagram showing a two-level switching circuit for one phase of the two-level switching circuit.

FIG. 8 is a diagram showing a two-level switching circuit for one phase of the two-level switching circuit 20b. The two-level switching circuit 20b has the two-level switching circuit shown in FIG. 8 for each of the three phases. Here, the switching devices are denoted as follows.

Q1: Switching device connected to the DC positive electrode
Q4: Switching device connected to the DC negative electrode FIG. 9 is a diagram showing the relationship between the destination of the output test pulse and the short-circuit failure device (switching device) in the failure diagnosis performed in the power conversion device 2b.

Figure 9:
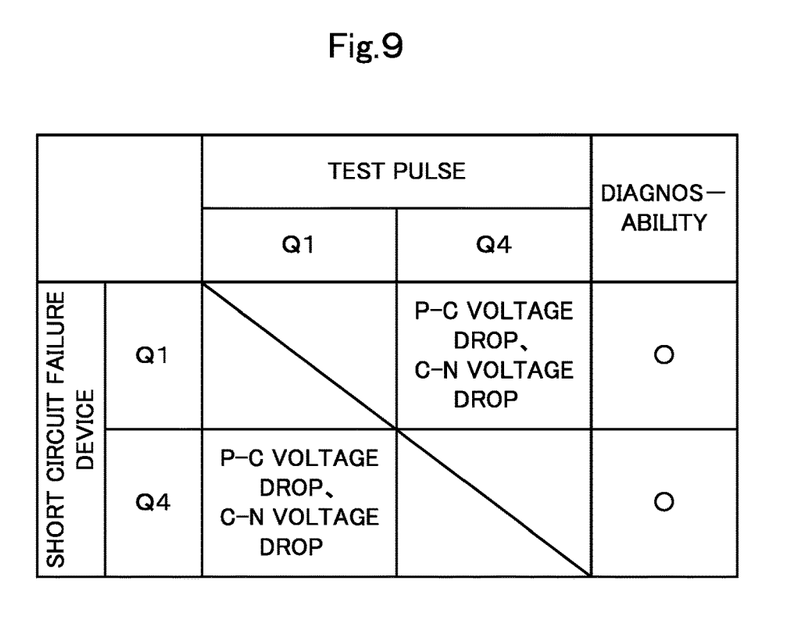
FIG. 9 is a diagram showing the relationship between the destination of the output test pulse and the short-circuit failure device (switching device) in the failure diagnosis performed in the power conversion device.

As shown in FIG. 9, in the power conversion device 2b, when the test pulse output unit 28 outputs a test pulse to the switching device connected to the DC positive electrode, the determination unit 29 determines, upon drop in the voltage between the DC positive electrode and the DC neutral point and the voltage between the DC neutral point and the DC negative electrode detected by the voltage detection unit 26, that the switching device connected to the DC negative electrode has a short circuit failure.

Also, in the power conversion device 2b, when the test pulse output unit 28 outputs a test pulse to the switching device connected to the DC negative electrode, the determination unit 29 determines, upon drop in the voltage between the DC positive electrode and the DC neutral point and the voltage between the DC neutral point and the DC negative electrode detected by the voltage detection unit 26, that the switching device connected to the DC positive electrode has a short circuit failure.

Hence, the power conversion device 2, the power conversion device 2*a*, and the power conversion device 2*b* can be used to diagnose the presence or absence of short circuit failures of switching devices even when they are connected to a DC power supply device, such as a photovoltaic device 10.

For example, the power conversion device 2, the power conversion device 2*a*, and the power conversion device 2*b* diagnose the presence or absence of short circuit failures of switching devices based on how the DC voltage changes (or how the DC current from the photovoltaic device 10 is) by sequentially outputting short-time test pulses to all the devices in the low-voltage region during main circuit voltage charge, such as at sunrise.

For example, the power conversion device 2, the power conversion device 2*a*, and the power conversion device 2*b* are charged to a voltage as low as about 50 V to perform automatic diagnosis.

In other words, the power conversion device 2, the power conversion device 2*a*, and the power conversion device 2*b* can safely perform diagnosis by outputting test pulses in the low-voltage region, thereby preventing short-circuit troubles and secondary damage to other components.

REFERENCE SIGNS LIST

1, 1*a*, 1*b* power system
2, 2*a*, 2*b* power conversion device
10 photovoltaic device
12 AC power supply system
20 three-level TNPP circuit
20*a* three-level NPP circuit
20*b* two-level switching circuit
21 filter
22 circuit breaker
23 circuit breaker
24 voltmeter
25 voltmeter
26 voltage detection unit
27 execution judgement unit
28 test pulse output unit
29 determination unit

The invention claimed is:

1. A power conversion device with a three-level TNPP circuit, comprising:
   voltage detection circuitry that detects a voltage between a DC positive electrode and a DC neutral point, the voltage between the DC neutral point and a DC negative electrode, and the voltage between the DC positive electrode and the DC negative electrode;
   test pulse output circuitry that outputs a test pulse to an inner switching device connected in a forward direction from the DC neutral point to an AC output terminal when the voltages detected by the voltage detection circuitry rise and exceed a predetermined threshold set in a low-voltage region; and
   determination circuitry that determines, when the test pulse output circuitry outputs a test pulse to the inner switching device connected in the forward direction from the DC neutral point to the AC output terminal, upon drop in the voltage between the DC neutral point and the DC negative electrode detected by the voltage detection circuitry, that an outer switching device connected to the DC negative electrode has a short circuit failure.

2. A power conversion device with a three-level TNPP circuit, comprising:
   a voltage detection circuitry that detects a voltage between a DC positive electrode and a DC neutral point, the voltage between the DC neutral point and a DC negative electrode, and the voltage between the DC positive electrode and the DC negative electrode;
   test pulse output circuitry that outputs a test pulse to an inner switching device connected in a reverse direction from the DC neutral point to an AC output terminal when the voltages detected by the voltage detection circuitry rise and exceed a predetermined threshold set in a low-voltage region; and
   determination circuitry that determines, when the test pulse output circuitry outputs a test pulse to the inner switching device connected in the reverse direction from the DC neutral point to the AC output terminal, upon drop in the voltage between the DC positive electrode and the DC neutral point detected by the voltage detection circuitry, that an outer switching device connected to the DC positive electrode has a short circuit failure.

3. A power conversion device with a three-level TNPP circuit, comprising:
   voltage detection circuitry that detects a voltage between a DC positive electrode and a DC neutral point, the voltage between the DC neutral point and a DC negative electrode, and the voltage between the DC positive electrode and the DC negative electrode;
   test pulse output circuitry that outputs a test pulse to an outer switching device connected to the DC positive electrode when the voltages detected by the voltage detection circuitry rise and exceed a predetermined threshold set in a low-voltage region; and
   a determination circuitry that determines, when the test pulse output circuitry outputs a test pulse to the outer switching device connected to the DC positive electrode, upon drop in the voltage between the DC positive electrode and the DC neutral point detected by the voltage detection circuitry, that an inner switching device connected in a reverse direction from the DC neutral point to an AC output terminal has a short circuit failure.

4. A power conversion device with a three-level TNPP circuit, comprising:
   voltage detection circuitry that detects a voltage between a DC positive electrode and a DC neutral point, the voltage between the DC neutral point and a DC negative electrode, and the voltage between the DC positive electrode and the DC negative electrode;
   test pulse output circuitry that outputs a test pulse to an outer switching device connected to the DC positive electrode when the voltages detected by the voltage detection circuitry rise and exceed a predetermined threshold set in a low-voltage region; and
   determination circuitry that determines, when the test pulse output circuitry outputs a test pulse to the outer switching device connected to the DC positive electrode, upon drop in the voltage between the DC positive electrode and the DC negative electrode detected by the voltage detection circuitry, that an outer switching device connected to the DC negative electrode has a short circuit failure.

5. A power conversion device with a three-level TNPP circuit, comprising:
- voltage detection circuitry that detects a voltage between a DC positive electrode and a DC neutral point, the voltage between the DC neutral point and a DC negative electrode, and the voltage between the DC positive electrode and the DC negative electrode;
- test pulse output circuitry that outputs a test pulse to an outer switching device connected to the DC negative electrode when the voltages detected by the voltage detection circuitry rise and exceed a predetermined threshold set in a low-voltage region; and
- a determination circuitry that determines, when the test pulse output circuitry outputs a test pulse to the outer switching device connected to the DC negative electrode, upon drop in the voltage between the DC positive electrode and the DC negative electrode detected by the voltage detection circuitry, that an outer switching device connected to the DC positive electrode has a short circuit failure.

6. A power conversion device with a three-level TNPP circuit, comprising:
- voltage detection circuitry that detects a voltage between a DC positive electrode and a DC neutral point, the voltage between the DC neutral point and a DC negative electrode, and the voltage between the DC positive electrode and the DC negative electrode;
- test pulse output circuitry that outputs a test pulse to an outer switching device connected to the DC negative electrode when the voltages detected by the voltage detection circuitry rise and exceed a predetermined threshold set in a low-voltage region; and
- determination circuitry that determines, when the test pulse output circuitry outputs a test pulse to the outer switching device connected to the DC negative electrode, upon drop in the voltage between the DC neutral point and the DC negative electrode detected by the voltage detection circuitry, that an inner switching device connected in a forward direction from the DC neutral point to an AC output terminal has a short circuit failure.

7. A method of diagnosing failures of switching devices included in a three-level TNPP circuit, comprising:
- detecting a voltage between a DC positive electrode and a DC neutral point, the voltage between the DC neutral point and a DC negative electrode, and the voltage between the DC positive electrode and the DC negative electrode;
- outputting a test pulse to an inner switching device connected in a forward direction from the DC neutral point to an AC output terminal when the detected voltages rise and exceed a predetermined threshold set in a low-voltage region; and
- determining, when a test pulse is output to the inner switching device connected in the forward direction from the DC neutral point to the AC output terminal, upon drop in the voltage between the DC neutral point and the DC negative electrode, that an outer switching device connected to the DC negative electrode has a short circuit failure.

8. A method of diagnosing failures of switching devices included in a three-level TNPP circuit, comprising:
- detecting a voltage between a DC positive electrode and a DC neutral point, the voltage between the DC neutral point and a DC negative electrode, and the voltage between the DC positive electrode and the DC negative electrode;
- outputting a test pulse to an inner switching device connected in a reverse direction from the DC neutral point to an AC output terminal when the detected voltages rise and exceed a predetermined threshold set in a low-voltage region; and
- determining, when a test pulse is output to the inner switching device connected in the reverse direction from the DC neutral point to the AC output terminal, upon drop in the voltage between the DC positive electrode and the DC neutral point, that an outer switching device connected to the DC positive electrode has a short circuit failure.

9. A method of diagnosing failures of switching devices included in a three-level TNPP circuit, comprising:
- detecting a voltage between a DC positive electrode and a DC neutral point, the voltage between the DC neutral point and a DC negative electrode, and the voltage between the DC positive electrode and the DC negative electrode;
- outputting a test pulse to an outer switching device connected to the DC positive electrode when the detected voltages rise and exceed a predetermined threshold set in a low-voltage region; and
- determining, when a test pulse is output to the outer switching device connected to the DC positive electrode, upon drop in the voltage between the DC positive electrode and the DC neutral point, that an inner switching device connected in a reverse direction from the DC neutral point to an AC output terminal has a short circuit failure.

10. A method of diagnosing failures of switching devices included in a three-level TNPP circuit, comprising:
- detecting a voltage between a DC positive electrode and a DC neutral point, the voltage between the DC neutral point and a DC negative electrode, and the voltage between the DC positive electrode and the DC negative electrode;
- outputting a test pulse to an outer switching device connected to the DC positive electrode when the detected voltages rise and exceed a predetermined threshold set in a low-voltage region; and
- determining, when a test pulse is output to the outer switching device connected to the DC positive electrode, upon drop in the voltage between the DC positive electrode and the DC negative electrode, that an outer switching device connected to the DC negative electrode has a short circuit failure.

11. A method of diagnosing failures of switching devices included in a three-level TNPP circuit, comprising:
- detecting a voltage between a DC positive electrode and a DC neutral point, the voltage between the DC neutral point and a DC negative electrode, and the voltage between the DC positive electrode and the DC negative electrode;
- outputting a test pulse to an outer switching device connected to the DC negative electrode when the detected voltages rise and exceed a predetermined threshold set in a low-voltage region; and
- determining, when a test pulse is output to the outer switching device connected to the DC negative electrode, upon drop in the voltage between the DC positive electrode and the DC negative electrode, that an outer switching device connected to the DC positive electrode has a short circuit failure.

12. A method of diagnosing failures of switching devices included in a three-level TNPP circuit, comprising:

detecting a voltage between a DC positive electrode and a DC neutral point, the voltage between the DC neutral point and a DC negative electrode, and the voltage between the DC positive electrode and the DC negative electrode;

outputting a test pulse to an outer switching device connected to the DC negative electrode when the detected voltages rise and exceed a predetermined threshold set in a low-voltage region; and determining, when a test pulse is output to the outer switching device connected to the DC negative electrode, upon drop in the voltage between the DC neutral point and the DC negative electrode, that an inner switching device connected in a forward direction from the DC neutral point to an AC output terminal has a short circuit failure.

13. A power conversion device with a two-level switching circuit, comprising:

a voltage detection unit that detects the voltage between a DC positive electrode and a DC neutral point, the voltage between the DC neutral point and a DC negative electrode, and the voltage between the DC positive electrode and the DC negative electrode;

a test pulse output unit that outputs a test pulse to a switching device connected to the DC positive electrode when the voltages detected by the voltage detection unit rise and exceed a predetermined threshold set in a low-voltage region; and a determination unit that determines, when the test pulse output unit outputs a test pulse to the switching device connected to the DC positive electrode, upon drop in the voltage between the DC positive electrode and the DC neutral point and the voltage between the DC neutral point and the DC negative electrode detected by the voltage detection unit, that a switching device connected to the DC negative electrode has a short circuit failure.

14. A power conversion device with a two-level switching circuit, comprising:

a voltage detection unit that detects the voltage between a DC positive electrode and a DC neutral point, the voltage between the DC neutral point and a DC negative electrode, and the voltage between the DC positive electrode and the DC negative electrode;

a test pulse output unit that outputs a test pulse to a switching device connected to the DC negative electrode when the voltages detected by the voltage detection unit rise and exceed a predetermined threshold set in a low-voltage region; and a determination unit that determines, when the test pulse output unit outputs a test pulse to the switching device connected to the DC negative electrode, upon drop in the voltage between the DC positive electrode and the DC neutral point and the voltage between the DC neutral point and the DC negative electrode detected by the voltage detection unit, that a switching device connected to the DC positive electrode has a short circuit failure.

15. A method of diagnosing failures of switching devices included in a two-level switching circuit, comprising:

a voltage detection step of detecting the voltage between a DC positive electrode and a DC neutral point, the voltage between the DC neutral point and a DC negative electrode, and the voltage between the DC positive electrode and the DC negative electrode;

a test pulse output step of outputting a test pulse to a switching device connected to the DC positive electrode when the detected voltages rise and exceed a predetermined threshold set in a low-voltage region; and a determination step of determining, when a test pulse is output to the switching device connected to the DC positive electrode, upon drop in the voltage between the DC positive electrode and the DC neutral point and the voltage between the DC neutral point and the DC negative electrode, that a switching device connected to the DC negative electrode has a short circuit failure.

16. A method of diagnosing failures of switching devices included in a two-level switching circuit, comprising:

a voltage detection step of detecting the voltage between a DC positive electrode and a DC neutral point, the voltage between the DC neutral point and a DC negative electrode, and the voltage between the DC positive electrode and the DC negative electrode;

a test pulse output step of outputting a test pulse to a switching device connected to the DC negative electrode when the detected voltages rise and exceed a predetermined threshold set in a low-voltage region; and a determination step of determining, when the test pulse output unit outputs a test pulse to the switching device connected to the DC negative electrode, upon drop in the voltage between the DC positive electrode and the DC neutral point and the voltage between the DC neutral point and the DC negative electrode, that a switching device connected to the DC positive electrode has a short circuit failure.

* * * * *